STIRLING CYCLE MACHINE WITH SELF-OSCILLATING REGENERATOR

Original Filed Feb. 1, 1968 5 Sheets-Sheet 1

INVENTORS
ARTHUR R. BAUMGARDNER
RICHARD P. JOHNSTON
WILLIAM R. MARTINI
MAURICE A. WHITE
BY Clark M. Jeu
-AGENT-

STIRLING CYCLE MACHINE WITH SELF-OSCILLATING REGENERATOR

Original Filed Feb. 1, 1968 5 Sheets-Sheet 2

INVENTORS
ARTHUR R. BAUMGARDNER
RICHARD P. JOHNSTON
WILLIAM R. MARTINI
MAURICE A. WHITE
BY Clark N. Jew
- AGENT -

STIRLING CYCLE MACHINE WITH SELF-OSCILLATING REGENERATOR

Original Filed Feb. 1, 1968 5 Sheets-Sheet 3

INVENTORS
ARTHUR R. BAUMGARDNER
RICHARD P. JOHNSTON
WILLIAM R. MARTINI
MAURICE A. WHITE
BY Wade N. Jew
- AGENT -

STIRLING CYCLE MACHINE WITH SELF-OSCILLATING REGENERATOR

Original Filed Feb. 1, 1968 5 Sheets-Sheet 4

INVENTORS
ARTHUR R. BAUMGARDNER
RICHARD P. JOHNSTON
WILLIAM R. MARTINI
MAURICE A. WHITE
BY Dock N. Jeu
- AGENT -

STIRLING CYCLE MACHINE WITH SELF-OSCILLATING REGENERATOR

Original Filed Feb. 1, 1968 5 Sheets-Sheet 5

INVENTORS
ARTHUR R. BAUMGARDNER
RICHARD P. JOHNSTON
WILLIAM R. MARTINI
MAURICE A. WHITE
BY Dale N. Jeu
-AGENT- United States Patent Office Re. 27,567
Reissued Jan. 23, 1973

27,567

STIRLING CYCLE MACHINE WITH SELF-OSCILLATING REGENERATOR

Arthur R. Baumgardner, Fair Oaks, Calif., and Richard P. Johnston, Kennewick, William R. Martini, Richland, and Maurice A. White, Kennewick, Wash., assignors to McDonnell Douglas Corporation Original No. 3,484,616, dated Dec. 16, 1969, Ser. No. 702,420, Feb. 1, 1968. Application for reissue Mar. 31, 1971, Ser. No. 130,042
Int. Cl. H02p *9/04;* F02g *1/04*
U.S. Cl. 290—1 13 Claims

Matter enclosed in heavy brackets [ ] appears in the original patent but forms no part of this reissue specification; matter printed in italics indicates the additions made by reissue.

ABSTRACT OF THE DISCLOSURE

Constant volume regenerative, or Stirling, cycle thermal machine having a self-oscillating regenerator. Regenerator is supported by spring adapted to be attached to fixed structure, and includes a porous, high heat storage capacity, matrix positioned between two thin orfiice plates. The orifice plates have many small holes which cause the working fluid of machine passing through the matrix to jet against the heating and cooling walls thereof to enhance heat transfer between working fluid and the walls.

CROSS-REFERENCE TO RELATED APPLICATION

A Stirling cycle machine having an independently oscillated regenerator is shown, described and claimed in a copending patent application of William R. Martini, Ser. No. 702,745, filed Feb. 2, 1968 for Stirling Cycle Amplifying Machine.

BACKGROUND OF THE INVENTION

This invention relates generally to thermal regenerative machines and more particularly to a [Sterling] *Stirling* cycle engine with a self oscillating regenerator.

As is well-known, there are two main types of Stirling cycle thermal machines. These are the double cylinder, two piston type and the single cylinder, piston and displacer type. Each of these types has two working spaces filled with the working fluid and connected by a duct which includes fixed regenerator and heat exchangers therein. The working spaces are at the different extreme temperatures of the working cycle, and one space is for expansion of the working fluid or gas while the other space is for compression thereof. The two pistons of the double cylinder type are connected by suitable linkages to a crankshaft at which power input is provided or power output is derived. The crankshaft and linkages maintain a proper phase relationship between the two pistons such that their respective working spaces are appropriately varied in volume approximately in conformance with the Stirling thermodynamic cycle.

Similarly, the piston and displacer of the single cylinder type are connected by suitable linkages to a crankshaft where power input is supplied or power output is delivered. The crankshaft and linkages of the single cylinder type also maintain a proper phase relationship between the piston and displacer such that the expansion and compression spaces respectively at the two ends of the single cylinder are appropriately varied in volume according to the Stirling cycle. The piston alternately compresses and expands the working fluid as the displacer, which separates the working spaces, synchronously shifts the working fluid through the regenerator and heat exchangers back and forth between the connected spaces.

The movement of the displacer is timed to place most of the working fluid in the compression space when the piston makes its compression stroke, and most of the fluid in the expansion space during its expansion stroke. The Stirling cycle has the same efficiency as the well-known Carnot cycle for the same operating temperature limits but differs from the latter cycle in that the two adiabatic lines thereof are replaced by two constant volume lines.

The Stirling cycle is a thermodynamic cycle wherein a fluid or gas alternately undergoes constant volume and constant temperature processes and in which the heat-up and cool-down of the gas is done at constant volume by a thermal regenerator. This cycle has Carnot cycle efficiency. The Ericsson cycle is similar to the Stirling cycle except that the heat-up and cool-down of the gas is done at constant pressure by the regenerator. This cycle also has Carnot cycle efficiency.

The real engine with a mechanical linkage that places the two pistons, or the piston and displacer, in simple harmonic motion 90 degrees out of phase with each other rounds the corners of the idealized thermodynamic cycles mentioned above. In the real engine, the heat-up and cool-down of the gas is actually done at changing volume and pressure by a regenerator. Nevertheless, if it is assumed that the regenerator is perfect and heat transfer to and from the gas is perfect, then this engine, loosely called a Stirling cycle engine, also has Carnot cycle efficiency.

The mechanical motion imposed by the design of the real Stirling engine just described is not always the most advantageous. For instance, instantaneous control of the power output of the engine could be obtained by varying either the phase angle or the amplitude of the regenerator motion. In fact, a constant phase angle is not always advantageous. For instance, in certain pumping engines (like that [show] *shown* in FIGURE 1 below), the phase angle changes periodically during each cycle. Nevertheless, any or all of these engines would have perfect, Carnot cycle, efficiency if the heat transfer were perfect and if the regenerator were perfect. It is noted that when an adequately efficient regenerator is used in the Stirling cycle machine, the whole working cycle is reversible and the same machine can be an engine or refrigerator.

An engine with a 90-degree phase angle between two power pistons or between displacer and piston produces the most power at the highest efficiency. Losses in the mechanical linkages in the engine is a separate problem. The crankshaft and linkages mechanism mentioned above for providing a proper phase relationship between the moving elements is comparatively complicated and has precipitated seal problems which have limited the operating lifetime of the prior Stirling cycle machines. Thus, if the phase-maintaining mechanism can be eliminated from the Stirling cycle machines, a simpler machine resulting in higher efficiency and increased life-time will be obtained.

SUMMARY OF THE INVENTION

Generally, the invention is preferably accomplished, in short, by providing a regenerator vessel forming a chamber wherein a regenerator oscillates in a reciprocating motion along the central axis of the chamber between a hot and a cold surface thereof such that the volume changes therein cause a cyclic variation in pressure and the differences in mean pressure produce large output pressure pulses which can be suitably directed to means for converting such pulses into mechanical energy or movement.

The regenerator is supported by a spring which is attached to fixed structure. The regenerator is free to oscillate in its chamber containing a suitable working fluid. The regenerator is preferably a disc having a porous matrix of a high heat storage capacity material sandwiched between two thin orifice plates. These orifice plates have many small holes therein which cause the working fluid passing through the porous matrix to jet against the hot and cold surfaces of the regenerator chamber, to enhance and increase heat transfer between the working fluid and the hot and cold surfaces.

BRIEF DESCRIPTION OF THE DRAWINGS

This invention will be more fully understood, and other features and advantages thereof will become apparent, from the following description of certain illustrative embodiments of the invention. The description is to be taken in conjunction with the accompanying drawings, in which.

DESCRIPTION OF THE PRESENT EMBODIMENTS

Figure 1:
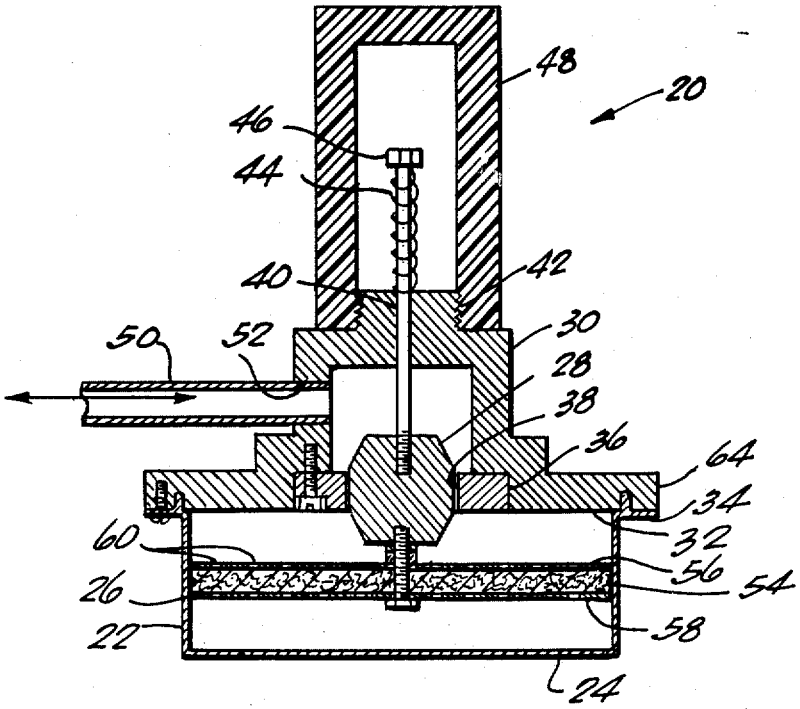
FIGURE 1 is a central sectional view of a closed cycle regenerative thermal machine according to this invention.

FIGURE 1 is a central sectional view in substantially accurate, relative dimensional proportions of a working model of a closed cycle regenerative thermal machine 20 constructed in accordance with this invention. The machine 20 is generally symmetrical circularly about the central axis of the plane shown and includes a regenerator vessel 22 having a lower heating wall 24, a regenerator 26 secured to the lower end of a plunger 28, an upper housing 30 having a lower cooling wall 32 to which is attached the upper end flange 34 of the vessel 22, a plunger opening plate 36 secured centrally to the housing 30 and providing a closely fitting passageway opening 38 for the plunger 28, a rod 40 journaled centrally in the upper end 42 of the housing 30 and having its lower end threadedly attached to the upper end of the plunger 28, a helical spring 44 positioned on the rod 40 and having its ends respectively engaging head 46 of the rod 40 and the upper surface of the housing 30, a cover housing 48 threadedly attached to the upper end of the housing 30 for enclosing the upper portion of the rod 40 and the spring 44, and a tubing 50 having an end fastened in opening 52 of housing 30 for conveying output pressure pulses to drive a suitable load which may be a closed bellows (not shown in FIGURE 1).

The regenerator 26 can be in the form of a circular disc which has a porous maxtrix 54 of metallic wool sandwiched between thin orifice plates 56 and 58. The regenerator 26 is free to oscillate up and down and essentially seals against the side wall of the regenerator vessel 22.

The matrix material has a high heat storage capacity but its porosity enables it to maintain a large thermal gradient from one orifice plate to the other. The matrix 54 can consist of stainless steel wool and the orifice plates 56 and 58 can be thin steel plates, for example. The regenerator vessel 22, plunger 28, plunger opening plate 36, rod 40 and spring 44 can also be made of steel. In the exemplary machine 20 shown in FIGURE 1, however, the upper housing 30 is preferably made of brass, the cover housing 48 is of plexiglass and the tubing 50 is of plastic. Obviously, the types of materials noted herein are given by way of example only and are not intended to limit the scope of this invention in any manner. As with the regenerator 26, no moving seals are necessary between the plunger 28 and the surface of passageway opening 38 since the plunger 28 only restricts flow of the working fluid and does not seal against the surface of the passageway opening 38.

The working fluid [cotnained] *contained* in the machine 20 is air, for example. However, helium or any other appropriate gas can also be used as the working fluid. Heat can be supplied to the heating wall 24 by means of a burner and the cooling wall 32 can be part of a cooler plate of sufficient exterior surface are exposed to the atmosphere. Of course, the heating wall 24 can be heated electrically or in any other manner, and the cooling wall 32 can be cooled by circulating water therein or in any other manner. The regenerator 26 represents a sharp thermal boundary between the hot and cold spaces in the vessel 22. Its motion greatly changes the relative volume of these spaces in the vessel 22 and consequently the pressure of the working space in the housing 30.

Figure 2:
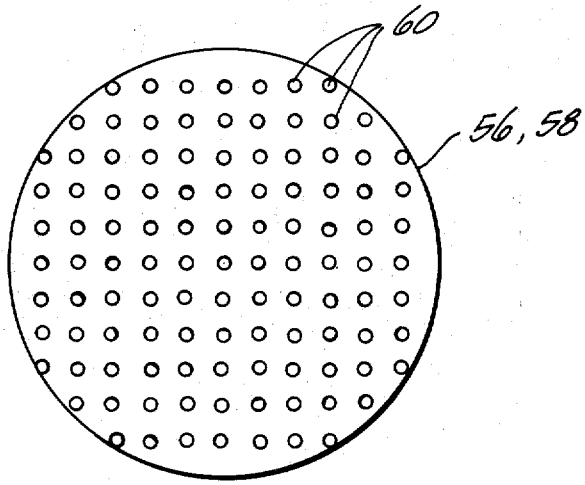
FIGURE 2 is a top plan view of an orifice plate of the regenerator used in the machine shown in FIGURE 1.

FIGURE 2 is a top plan view illustrating the hole pattern in the orifice plates 56 and 58. The basic function of the regenerator 26 is to absorb heat from the working fluid as the regenerator 26 moves toward the hot surface of wall 24, and to return the same heat to the working fluid a half cycle later as the regenerator 26 moves back toward the cold surface of the wall 32. The working fluid within the regenerator 26 is always in contact with a portion of the matrix 54 at nearly the same temperature as itself, so that the heating or cooling processes are substantially reversible. The regenerator orifice plates 56 and 58 have many small holes 60 which cause the working fluid to jet against the heating and cooling walls 24 and 32, thus greatly increasing the heat transfer between the working fluid and the walls 24 and 32.

Figure 3A:
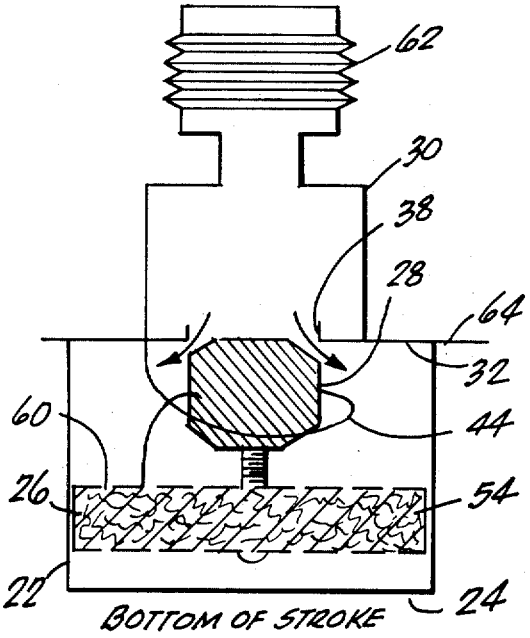
FIGURES 3A, 3B, 3C and 3D are diagrammatic, simplified sectional views illustrating the operation of the machine shown in FIGURE 1.

FIGURES 3A, 3B, 3C and 3D are diagrammatic, simplified sectional views of the regenerative thermal machine 20 shown in FIGURE 1, and illustrate the steps of operation thereof. While the spring 44 is shown as a tension spring in these figures, it is functionally identical to the compresison spring 44 of FIGURE 1. Bellows 62 for converting pressure pulses into mechanical output movement is schematically depicted in FIGURE 3A, and a closed cycle machine 20 is evidently shown. Heat is supplied continuously to the lower heating wall 24 of the regenerator vessel 22, and the lower cooling wall 32 of the upper housing 30 is part of a cooler plate 64 which is continuously exposed to the atmosphere. The regenerator 26 is assumed first at the bottom of its stroke, and the actuating pressure differential across the plunger 28 has equalized since the working fluid can flow around the plunger 28 into the vessel 22. The energy stored in the spring 44 then starts the regenerator 26 to move up. As the regenerator 26 moves upwards, some of the working fluid above it in the vessel 22 passes through the regenerator 26 and is heated by the heat deposited in the porous matrix 54 from the previous (down) stroke of the regenerator 26, and by the heat added into the vessel 22 through its lower heating wall 32.

Figure 3B:
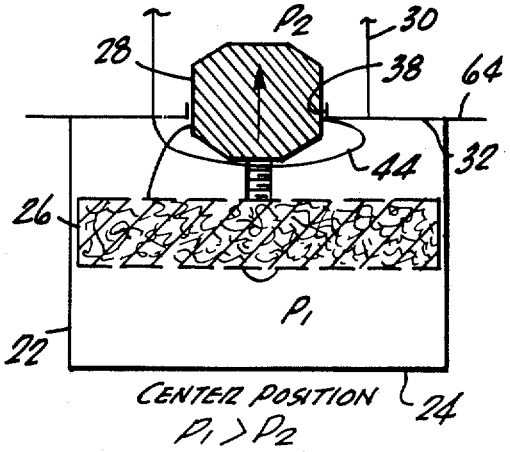
Figure 3C:
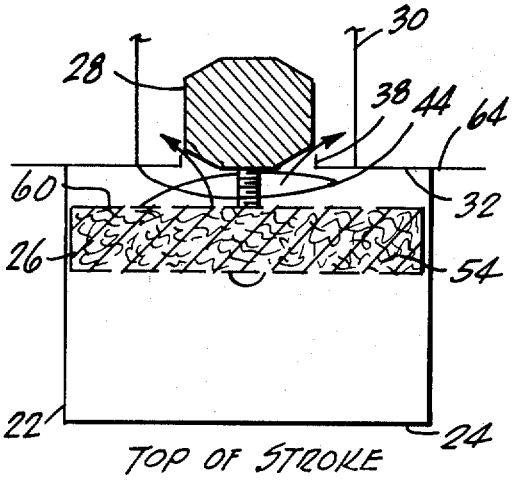

The plunger 28 enters the passageway opening 38 as shown in FIGURE 3B and restricts working fluid flow created by the heating of the working fluid in the regenerator vessel 22. Since the working fluid cannot easily escape out of the vessel 22, the pressure P1 inside becomes larger than the pressure P2 outside of it, creating a force acting on the plunger 28 to lift both the plunger 28 and regenerator 26. Movement of these elements continues to the top of the stroke as illustrated in FIGURE 3C at which time the plunger 28 moves out of the passageway opening 38 and a pressure pulse is generated. At the top position, working fluid escapes out the opening 38 until the pressure P1 inside the vessel 22 is reduced sufficiently to permit the plunger 28 to spring back into the opening 38.

Figure 3D:
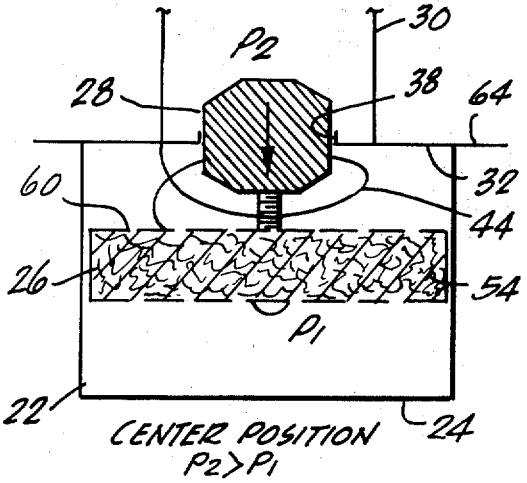

When the plunger 28 and regenerator 26 move downwards, the hot working fluid passes through the regenerator 26 and is thereby cooled by depositing its heat in the regenerator matrix 54. The working fluid is further cooled by the jetting action of the fluid emanating from the small holes 60 in the orifice plate 56, against the cold inside surface of the cooler plate 64. The pressure P1 inside of the vessel 22 is reduced to be lower than [ethe] *the* outside pressure P2 and this creates a force on the plunger 28 in the downward direction as indicated in FIGURE 3D. During the downward movement, the working fluid is cooled and energy is stored in the spring 44 to start the upward movement of the plunger 28 and regenerator 26 when the pressures are equalized at the bottom of the stroke, as shown in FIGURE 3A, to repeat the cycle of operation.

Each limit of stroke travel of the regenerator 26 is established by the equalizing of the pressure inside the regenerator vessel 22 with the pressure of the bellows 62 (FIGURE 3A). At the top of the stroke, the vessel's pressure is greater than the bellow's pressure and is equalized by working fluid flowing into the bellows 62 when the cylindrical portion of the plunger 28 moves pass the top of the passageway opening 38. At the bottom of the stroke, the pressure in the bellows 62 is greater than that in vessel 22, and is equalized by working fluid flow into the vessel 22 after the cylindrical portion of the plunger 28 moves pass the bottom of the passageway opening 38. Fluid flow is restricted from the time the cylindrical portion of the plunger 28 first enters the passageway opening 38 until the last part thereof leaves the opening 38, and this stroke length is the maximum available for given plunger 28 and pasageway opening 38 lengths. A shorter stroke can be obtained by allowing fluid leakage through increased space between the plunger 28 and the surface of pasageway opening 38. This relieves the pressure differential between the bellow's pressure and the vessel's pressure before the cylindrical portion of the plunger 28 leaves the passageway opening 38.

Figure 4:
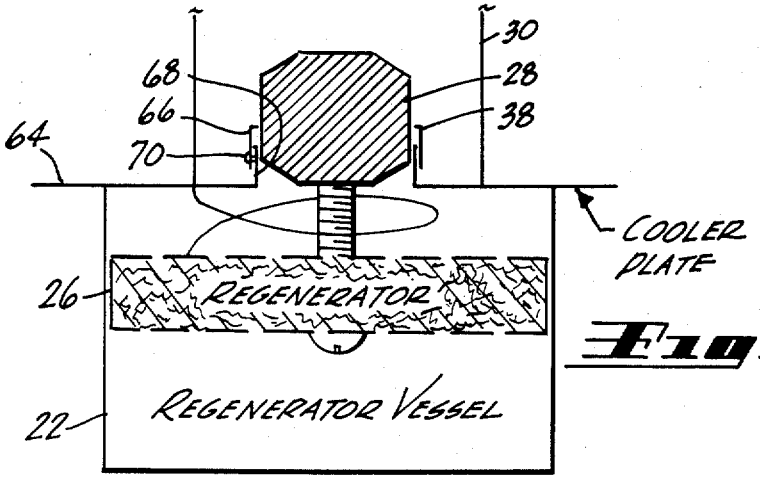
FIGURE 4 is a fragmentary, diagrammatic, simplified sectional view of a regenerative thermal machine having an adjustable thickness cooler plate opening for controlling the length of stroke of the regenerator of the machine.
Figure 5:
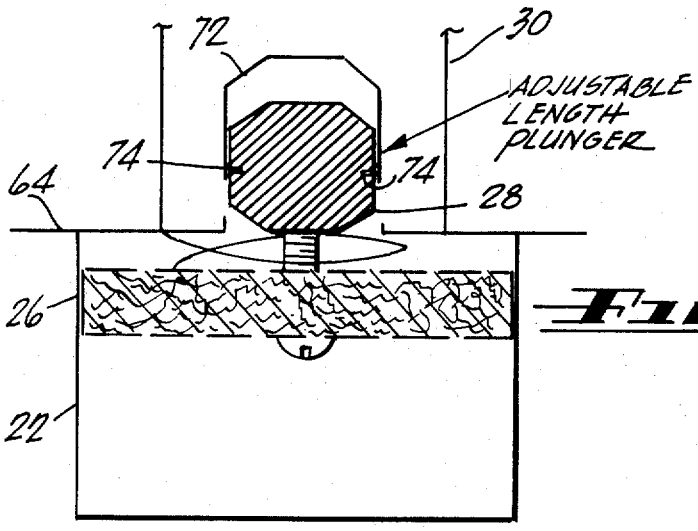
FIGURE 5 is a fragmentary, diagrammatic, simplified sectional view of a regenerative thermal machine having an adjustable length plunger for controlling the length of stroke of the regenerator of the machine.
Figure 6:
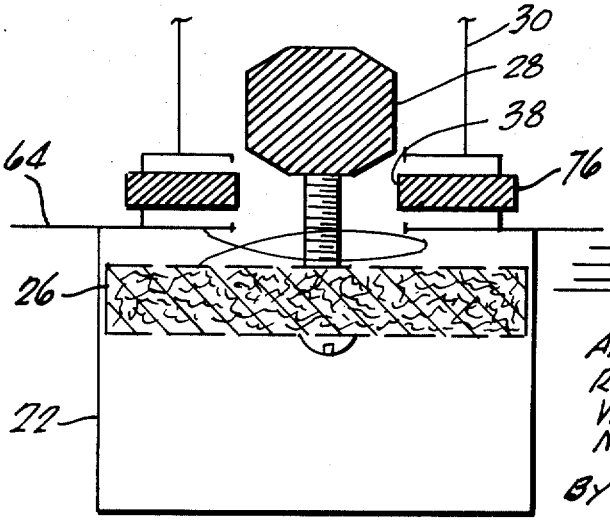
FIGURE 6 is a fragmentary, diagrammatic, simplified sectional view of a regenerative thermal machine having an adjustable diameter plunger opening for varying the leakage rate of working fluid around the plunger and thereby control the length of stroke of the regenerator of the machine.

FIGURES 4, 5 and 6 are fragmentary, diagrammatic, simplified sectional views showing three methods of controlling the length of stroke of the regenerator 26 in, for example, the machine 20 of FIGURE 3A. The length of stroke of the regenerator 26 controls the amount of work output and is a function of the thickness of passageway opening 38, the length of the plunger 28 and/or the leakage rate of working fluid around the plunger 28. In FIGURE 4, the thickness of passageway opening 38 of cooler plate 64 can be adjusted by varying the height of a sleeve 66 on its mating upright collar 68. The sleeve 66 is internally threaded to engage external threads on the collar 68. Any suitable means such as a small set screw 70 can be employed to secure the sleeve 66 in position on its mating collar 68.

Similarly, in FIGURE 5, a thin, telescoping, cover shell 72 which congruently matches the shape and contour of the upper portion of plunger 28 can be used to vary the effective length of the plunger 28. In this instance, the effective length of the plunger 28 can be adjusted by positioning the shell 72 at a desired height on the inner plunger 28 and securing the shell 72 in place thereon. Any suitable means such as the attachment screws 74 can be used to secure the shell 72 in position on its supporting plunger 28. The screws 74, of course, engage small threaded holes suitably provided in the circumferential surface of the plunger 28. Finally, in FIGURE 6, a variable diameter passageway opening 38 is obtained by means of adjustable aperture diaphragm means 76 which can be similar to the ordinary camera, lens aperture, diaphragm shutter mechanism and need not, therefore, be described in detail. An equivalent method to this is to maintain the passageway opening 38 fixed in diameter and provide another, adjustable, orifice (valve) in parallel with it to vary the effective opening area connecting chambers of the vessel 22 and the upper housing 30.

Figure 7:
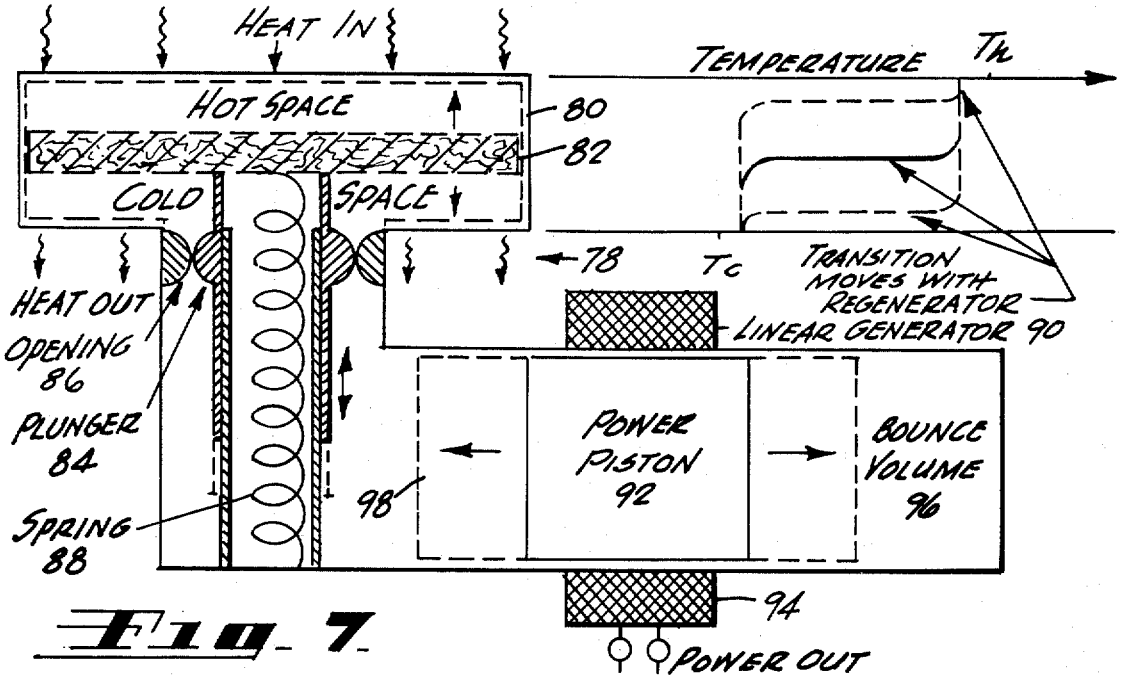
FIGURE 7 is a diagrammatic sectional view of a free piston Stirling cycle generator.

FIGURE 7 is a diagrammatic, simplified sectional view of a free piston Stirling cycle machine 78 which provides an electrical output. The machine 78 is similar to the machine 20 shown in FIGURE 1 and includes regenerator vessel 80, regenerator 82, plunger 84, passageway opening 86, spring 88 and a linear generator 90 having a peripherally magnetized moving piston 92 with cooperating output coils 94. The machine 78 is evidently a closed cycle device and the moving piston 92 is used in lieu of the bellows 62 shown in FIGURE 3A. In the example shown in FIGURE 7, the piston 92 is permanently magnetized to produce an electrical output from the coils 94. Of course, the piston 92 need not be a magnetized element and can be a power piston [proving] *providing* a suitable mechanical output. It is noted that bounce volume 96 produces an elastic effect for the piston 92 analogous to the elasticity of the bellows 62. The output pressure pulses of the machine 78 causes the piston 92 to oscillate or bounce back and forth within the limits indicated in broken lines 98 to generate an electrical output in the coils 94.

Figure 8:
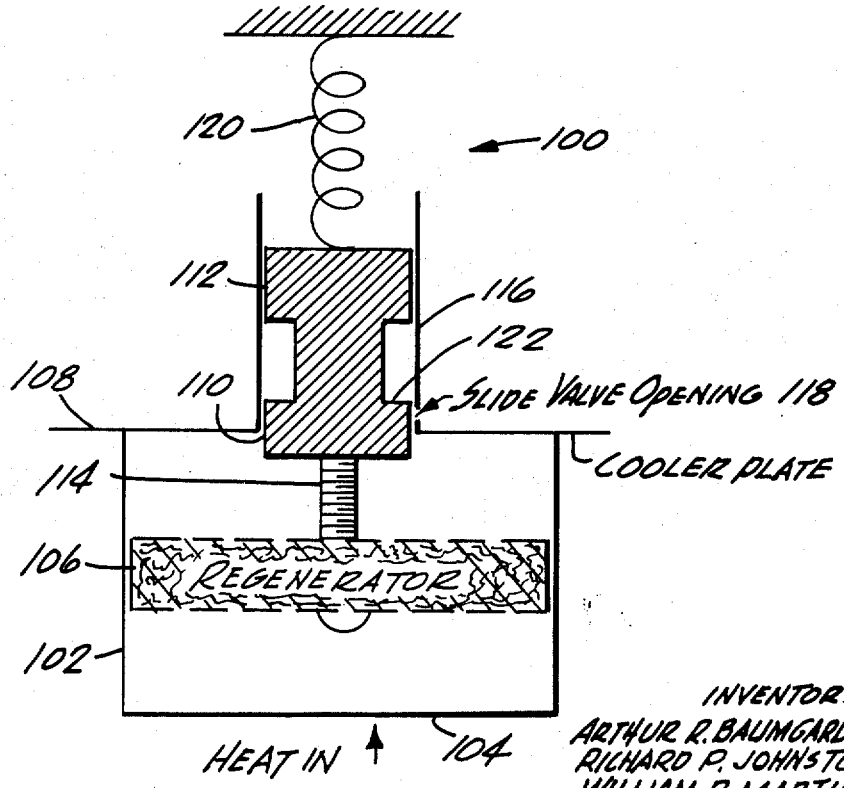
FIGURE 8 is a diagrammatic, simplified sectional view of the first successful working model of an open cycle regenerative thermal machine according to this invention.

FIGURE 8 is a diagrammatic, simplified sectional view illustrating the first successful working model of a machine 100 made in accordance with this invention. The machine 100 is an open cycle device wherein there is an interchange of the working fluid between the machine 100 and its surroundings. The machine 100 includes a regenerator vessel 102 having a lower heating wall 104, regenerator 106, a cooler plate 108 closing the vessel 102, a central opening 110 in the cooler plate 108, a plunger 112 connected to the regenerator 106 by shaft 114, a plunger guide tube 116 extending vertically from the opening 110 and accommodating movement of the plunger 112, the tube 116 having a small sliding valve or vent opening 118 located near its lower end, and a helical spring 120 having one end connected to the upper end of the plunger 114 and the other end connected to fixed structure.

The plunger 112 is centrally undercut as shown in FIGURE 8 and forms a sliding valve 122 with the small vent opening 118. The regenerator 106 is there depicted in the middle of its stroke. As it moves downward, the working fluid in the vessel 102 is cooled to reduce the pressure therein so that the atmospheric pressure on the top of the plunger 112 pushes it and the regenerator 106 downward until the sliding valve 122 opens to the working chamber of the vessel 102 and allows the atmospheric fluid (air) to flow into the vessel 102. The pressure equalizes, and the balance of the cycle is similar to that shown in FIGURES 3A through 3D, with the heated, high pressure working fluid exhausting through the sliding valve 122 at the highest portion of the regenerator 106 stroke when the lower end of the plunger 112 clears the vent opening 118 (valve 122 opens).

Figure 9:
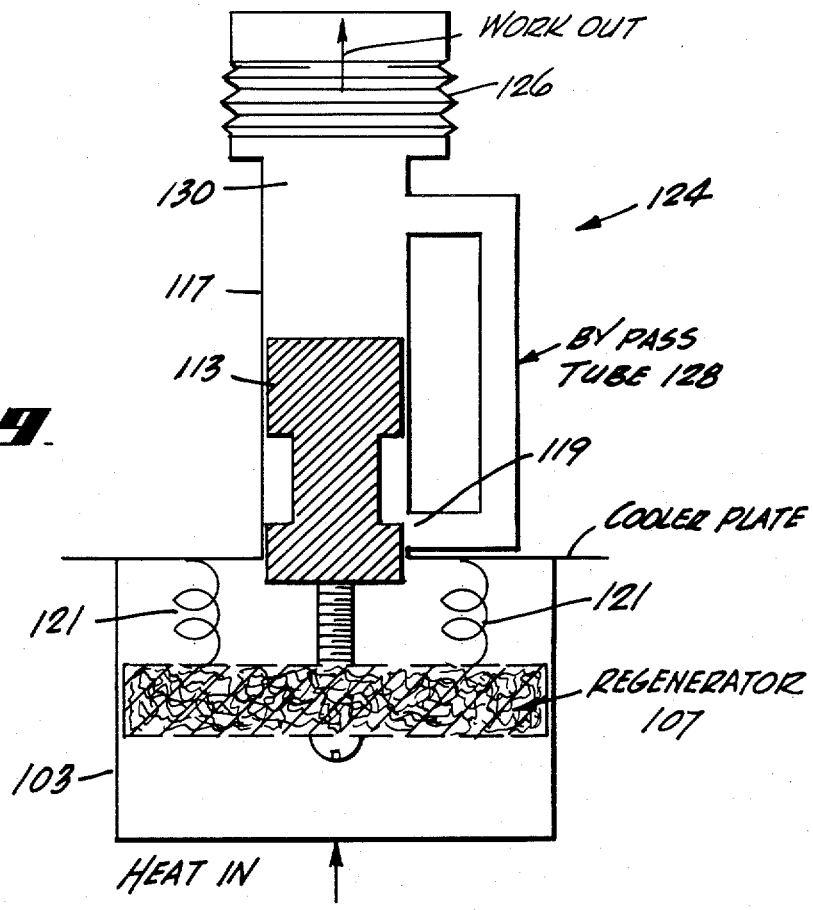
FIGURE 9 is a diagrammatic, simplified setcional view of a closed cycle version of the machine shown in FIGURE 8.

FIGURE 9 is a diagrammatic, simplified sectional view of a closed cycle version of the machine 100 shown in FIGURE 8. The unit or machine 124 is hermetically sealed so that the total mass of working fluid remains constant. The machine 124 is generally similar to the machine 100 of FIGURE 8 except that the upper end of plunger guide tube 117 is terminated by closed bellows 126, and a bypass tube 128 connects the vent opening 119 to a working chamber 130 above the plunger 113 so that fluid flow is directed to the chamber 130 rather than being vented to the atmosphere. The pressure fluctuations in the working chamber 130 drive the bellows 126 as shown, or can drive a power piston in lieu of the bellows 126. An air bearing, for example, can be used to seal and support the power piston. The static charge of working fluid can be pressurized above atmospheric pressure, and the springs 121 suspend the regenerator 107 so that it hangs in the center of the vessel 103 under gravitational force. The plunger 113 is closely fitted in the tube 117 and is undercut in the middle portion thereof as indicated. This machine 124 was the second model that was fabricated and successfully tested.

In operation, the bellows 126 in FIGURE 9 is assumed just about to expand while the regenerator 107 is moving upwards from the midpoint of its upstroke. The working fluid in vessel 103 is being heated as the expansion space below the regenerator 107 increases in volume. Shortly after this, the vent opening 119 opens allowing high pressure working fluid to flow through the bypass tube 128 into the working chamber 130 expanding the bellows 126. When the regenerator 107 is at the top of its stroke in the vessel 103, the system is at peak pressure and the bellows 126 is about one-half fully expanded as the regenerator 107 reverses its direction due to the force of springs 121. As the regenerator 107 moves downward, the working fluid is, of course, cooled in the vessel 103.

When the vent opening 119 is closed, as the regenerator 107 cools the working fluid and reduces the pressure in the vessel 103, the regenerator 107 is moved farther downwards in response to the higher working fluid pressure in the working chamber 130. During this time, the bellows 126 becomes fully expanded and as the vent opening 119 is opened, the higher pressure working fluid in the working chamber 130 begins to flow into the vessel 103 through the bypass tube 128 such that the bellows 126 starts to contract. The bellows 126 is about one-half fully contracted when the regenerator 107 again reverses its motion due to the springs 121 action and begins to move upwards. As the regenerator 107 moves upwards, the working fluid is heated in the vessel 103 and as the vent opening 119 is closed, the regenerator 107 receives an additional boost from the increasing pressure in the expansion space below it. When the regenerator 107 is midway in its upstroke, the cycle repeats in the manner described above.

Figure 10:
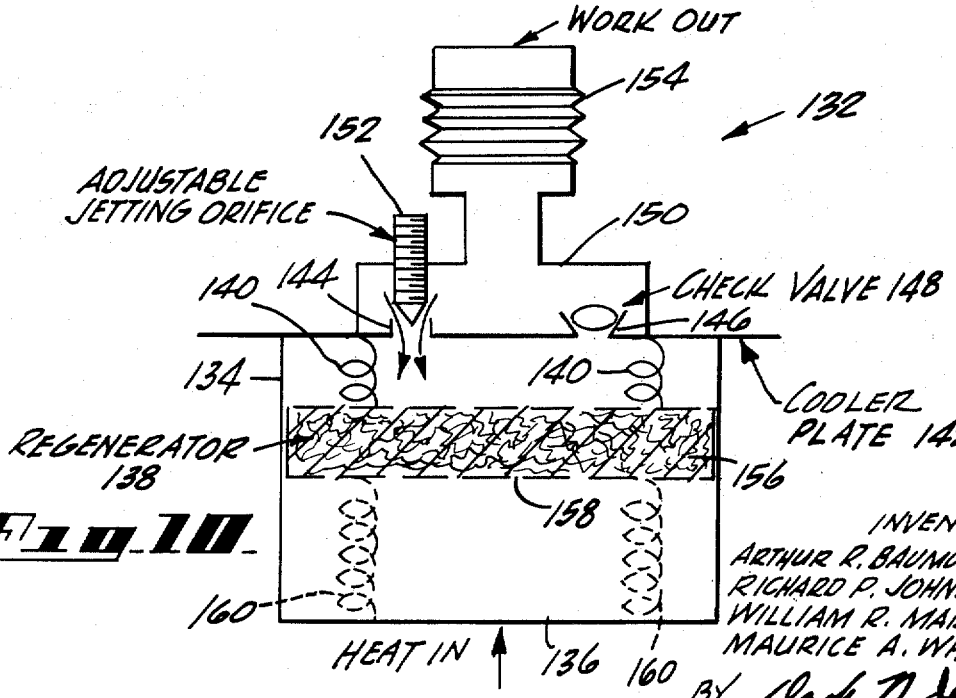
FIGURE 10 is a diagrammatic, simplified sectional view of another closed cycle version of a regenerative thermal machine according to this invention.

FIGURE 10 is a diagrammatic, simplified sectional view of a hydrodynamic version of the invention, as contrasted from the hydrostatic versions previously shown and described. The closed cycle, regenerative thermal machine 132 includes a regenerator vessel 134 having a lower heating wall 136, a regenerator 138 supported by tension springs 140 attached to a cooler plate 142 which closes the vessel 134, the cooler plate 142 having a jetting orifice 144 and an opening 146 for a check valve 148, an upper housing 150 enclosing the jetting orifice 144 and check valve 148 and mounting an adjustable screw 152 for the orifice 144, and a closed bellows 154 connected as shown to the housing 150. Heat is added to the working fluid in the machine 132 through the lower heating wall 136, and the cooler plate 142 dissipates heat to maintain a temperature difference inside the machine 132. The regenerator 138 is free to oscillate up and down and essentially seals against the side wall of the vessel 134. As in the other versions of the invention, the machine 132 and all of its component parts are merely exemplary of one form of putting this invention into effect. Various modifications of the machine 132 and of its components are, of course, to be included within the scope of the invention.

In operation, the regenerator 138 is first considered at the bottom of its stroke. Pressure inside the machine 132 is then at a minimum. The regenerator 138 starts to move upwards due to the energy stored in springs 140. Some of the working fluid passes through the regenerator 138 and is heated by the heat stored in its matrix 156 and by heat added through the lower heating wall 136 of the vessel 134. Due to this increase in temperature, the pressure increases in the vessel 134 and forces a portion of the working fluid through the orifice 144 and check valve 148 into the bellows 154 expanding the same. During the upward movement of the regenerator 138, working fluid is jetted through the small holes 158 in the orifice plates of the regenerator 138 against the hot surface of the lower heating wall 136 of the vessel 134 to maximize the heat transfer to the working fluid.

The top of the stroke is reached when the stored energy of the springs 140 is dissipated and the momentum of the regenerator 138 is overcome by gravity and the flow friction against the movement of the working fluid through the regenerator 138. The regenerator 138 then starts to move down due to the force of gravity on the regenerator 138. This action could be accomplished by tension springs 160, indicated in broken lines in FIGURE 10, if desired or required to avoid the use or effects of gravity in the machine 132. Such springs 160 could, of course, also be utilized in the hydrostatic versions of this invention if desired or required.

When the regenerator 138 starts to move down, the hot working fluid flowing through the regenerator 138 is cooled by heating up the regenerator's matrix 156 and is further cooled by jetting of the working fluid on the inside surface of the cooler plate 142. The heat from the working fluid is stored in the regenerator's matrix 156 and will be used in heating the working fluid on the next upstroke of the regenerator 138. A pressure decrease is obtained in the vessel 134 by cooling of the working fluid therein which causes flow of working fluid from the bellows 154 into the vessel 134 through the adjustable jetting orifice 144 to force the regenerator 138 down and store energy in the springs 140. The cycle is repeated when the regenerator 138 is at the bottom of its stroke and the pressure fluctuations produced are [con-] converted into mechanical output movements by the bellows 154.

The thermal regenerative machines as illustratively disclosed herein are engines producing a mechanical or pneumatic output. Also, heat is supplied to the hot or heat absorption space, and heat is rejected from the cold or heat rejection space at substantially atmospheric temperature. It is well-known, however, that a thermal regenerative machine can operate as a regular engine, a cold engine, a refrigerator or a heat pump. In the regular engine, heat is supplied at a relatively high temperature to the heat absorption space and heat is rejected from the heat rejection space at atmospheric temperature, and mechanical or pneumatic power is delivered by the machine as in the embodiments disclosed herein. In the cold engine, mechanical or pneumatic power is also delivered by the machine wherein heat is supplied to its heat absorption space at atmospheric temperature while heat is rejected from its heat rejection space at a much lower temperature.

As a refrigerator, mechanical energy is supplied to the machine and heat will be absorbed at a low temperature by the heat absorption space while heat is rejected from the heat rejection space at atmospheric temperature. In the heat pump, mechanical energy is also supplied to the machine. However, heat is absorbed at atmospheric temperature by the heat absorption space while heat is rejected from the heat rejection space at a higher temperature. In the engines, mechanical energy is produced by reducing heat energy from a high to a lower temperature level whereas in the refrigerators and heat pumps, mechanical energy is utilized to raise heat energy from a low to a higher temperature level.

Any one of the four types of machines mentioned above—heat engine, cold engine, refrigerator and heat pump—can be used in a combination driving another one operating in a similar mode. For instance, a cold engine-heat pump combination, a heat engine-heat pump combination, or any other such combination of the four types of machines.

This completes the description of the illustrative embodiments of this invention. While certain particular embodiments of the invention have been described above and shown in the accompanying drawings, it is to be understood that the described embodiments are merely illustrative of and not restrictive on the broad invention, and that various changes in design, structure and arrangement may be made in the disclosed embodiments of the invention without departing from the spirit and scope of the appended claims defining this invention.

What is claimed is:

1. A thermal regenerative machine comprising:

a vessel chamber including a relatively hot surface and a relatively cold surface, and filled with a working fluid;

a regenerator including a porous, high heat storage capacity, matrix;

means for mounting said regenerator in said vessel chamber, and adapted to permit oscillation of said regenerator towards and from said hot and cold surfaces;

an opening connecting said vessel chamber to an exterior region; and valving means for opening and closing said opening cyclically with the oscillation of said regenerator, for producing pressure difference fluctuations of said working fluid between said vessel chamber and said exterior region to drive said regenerator.

2. The invention as defined in claim 1 wherein said machine is an open cycle device and said exterior region is the atmosphere.

3. The invention as defined in claim 1 wherein said machine is a closed cycle device and said exterior region is a closed working chamber.

4. The invention as defined in claim 1 wherein said regenerator includes said porous matrix and thin orifice plates generally sandwiching said porous matrix therebetween, said orifice plates having many small holes therein for producing a jetting action of the working fluid passing from said porous matrix.

5. The invention as defined in claim 1 wherein said mounting means includes spring means adapted to engage relatively fixed structure for returning said regenerator normally towards a mid-stroke position and permit oscillation thereof.

6. The invention as defined in claim 1 wherein said valving means includes a plunger coupled to said regenerator and shaped to cooperate with said opening as a valve which is operated in accordance with the movement of said regenerator.

7. The invention as defined in claim 3 including an electrical generator having stationary coils installed on the walls of said working chamber and a movable, reciprocating [megnetized] *magnetized* piston adapted to be driven in said working chamber by said pressure difference fluctuations to produce an electrical output from said stationary coils.

8. The invention as defined in claim 6 wherein said opening is adjustable in axial length to vary the oscillation stroke length of said regenerator in said vessel chamber.

9. The invention as defined in claim 6 wherein said plunger is adjustable in axial length to vary the oscillation stroke length of said regenerator in said vessel chamber.

10. The invention as defined in claim 6 wherein effective opening area connecting said vessel chamber and said exterior region is adjustable to vary the flow rate of working fluid therebetween whereby the oscillation stroke length of said regenerator in said vessel chamber can be varied.

*11. A thermal regenerative machine comprising:*

*a vessel chamber including a relatively hot surface and a relatively cold surface, and filled with a working fluid;*

*a regenerator mounted in said vessel chamber and adapted to oscillate toward and from said hot and cold surfaces, said regenerator absorbing heat from said working fluid when said regenerator moves toward said hot surface and returning heat to said working fluid when said regenerator moves toward said cold surface;*

*at least one opening of predetermined size connecting said vessel chamber to an exterior region; and*

*means for producing pressure difference fluctuations between said working fluid in said vessel chamber and said exterior region to drive said regenerator, said pressure difference fluctuation producing means including a plunger means coupled to said regenerator and shaped laterally to move closely in said opening, and operated in accordance with the movement of said regenerator.*

*12. The invention as defined in claim 11 wherein said regenerator mounted in said vessel chamber is adapted to engage spring means connected to relatively fixed structure, for returning said regenerator normally toward a mid-stroke position and permit oscillation thereof.*

*13. The invention as defined in claim 11 wherein said plunger means is further shaped longitudinally to cooperate with said opening, and operated as valving means in accordance with the movement of said regenerator.*

References Cited

The following references, cited by the Examiner, are of record in the patented file of this patent or the original patent.

UNITED STATES PATENTS

| | | | |
|---|---|---|---|
| 278,446 | 5/1883 | McDonough | 60—24 |
| 1,614,961 | 1/1927 | Koenig | 60—24 |
| 1,675,829 | 7/1928 | Smith | 60—24 X |
| 1,895,082 | 1/1933 | Montero | 60—24 |
| 2,157,229 | 5/1939 | Bush | 60—24 |
| 2,907,169 | 10/1959 | Newton | 60—24 |
| 3,074,596 | 1/1963 | Marchi | 60—24 X |
| 3,220,178 | 11/1965 | Dineen | 62—6 X |
| 3,604,821 | 9/1971 | Martini | 60—24 |

MARTIN P. SCHWADRON, Primary Examiner

A. M. OSTRAGER, Assistant Examiner

U.S. Cl. X.R.

60—24; 62—6